United States Patent
Ringuette et al.

(10) Patent No.: US 12,380,883 B2
(45) Date of Patent: Aug. 5, 2025

(54) METHODS AND DEVICES FOR PREVENTING A SOUND ACTIVATED RESPONSE

(71) Applicant: LENOVO (SINGAPORE) PTE. LTD, New Tech Park (SG)

(72) Inventors: Justin Michael Ringuette, Morrisville, NC (US); Richard Todd Wall, Garner, NC (US); James D. Swank, Concord, NC (US); Mark Christopher Heidenfeldt, Apex, NC (US); Mark K. Summerville, Apex, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 363 days.

(21) Appl. No.: 17/457,303

(22) Filed: Dec. 2, 2021

(65) Prior Publication Data
US 2023/0178075 A1   Jun. 8, 2023

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01); *G10L 2015/088* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 10,573,329 B2* | 2/2020 | Embleton | G10L 19/018 |
| 11,150,869 B2* | 10/2021 | Lee | G10L 15/22 |
| 11,200,890 B2* | 12/2021 | Dunning | G10L 25/84 |
| 11,238,856 B2* | 2/2022 | Lee | H04L 65/60 |
| 11,355,108 B2* | 6/2022 | Lee | G10L 15/22 |
| 2017/0064246 A1* | 3/2017 | Kline | G11B 20/00086 |
| 2017/0125017 A1* | 5/2017 | Sugiyama | G10L 17/00 |
| 2017/0145804 A1* | 5/2017 | Wessling | G06Q 10/0631 |
| 2018/0025727 A1* | 1/2018 | Kume | G10L 17/22 |
| | | | 704/275 |
| 2018/0322881 A1* | 11/2018 | Min | G10L 15/32 |
| 2019/0043471 A1* | 2/2019 | Maziewski | H04K 3/00 |
| 2019/0272825 A1* | 9/2019 | O'Malley | G10L 15/20 |
| 2019/0297407 A1* | 9/2019 | Stanford-Jason | H04R 1/083 |
| 2019/0341035 A1* | 11/2019 | Lee | H04L 65/612 |
| 2019/0348034 A1* | 11/2019 | Bender | G10L 15/08 |
| 2019/0362719 A1* | 11/2019 | Gruenstein | G06F 3/167 |
| 2020/0043490 A1* | 2/2020 | Park | G06F 3/167 |
| 2020/0082816 A1* | 3/2020 | Mahajan | G10L 15/30 |
| 2020/0111480 A1* | 4/2020 | Hague | G10L 15/08 |
| 2020/0118558 A1* | 4/2020 | Wightman | G10L 15/10 |

(Continued)

*Primary Examiner* — Jonathan C Kim
(74) *Attorney, Agent, or Firm* — Dean D. Small; The Small Patent Law Group, LLC (57) ABSTRACT

A system for preventing a voice activated response by a digital personal is provided. The system includes a digital personal assistant that has a memory storing program instructions. The system also includes one or more processors that, when executing the program instructions, are configured to identify an audible instruction based on a determined sound, and receive a block signal accompanying the determined sound. The one or more processors are also configured to prevent a response to the determined sound based on the block signal.

19 Claims, 4 Drawing Sheets

(56) References Cited

U.S. PATENT DOCUMENTS

| | | | |
|---|---|---|---|
| 2020/0260186 A1* | 8/2020 | Stachura | G10L 15/30 |
| 2020/0320994 A1* | 10/2020 | Totsuka | G10L 17/22 |
| 2021/0056963 A1* | 2/2021 | Lee | G10L 15/30 |
| 2021/0225372 A1* | 7/2021 | Zhou | G10L 15/22 |
| 2021/0241759 A1* | 8/2021 | Yang | G06F 3/167 |
| 2021/0249016 A1* | 8/2021 | Foerster | G10L 15/26 |
| 2023/0178075 A1* | 6/2023 | Ringuette | G10L 15/08 704/251 |

* cited by examiner

METHODS AND DEVICES FOR PREVENTING A SOUND ACTIVATED RESPONSE

FIELD

The present disclosure relates generally to methods and devices for managing audio sound active responses by a digital personal assistant (DPA).

BACKGROUND OF THE INVENTION

In today's technology driven society, many users own multiple electronic devices that can be used for different types of communications, different tasks, and/or at different locations. For example, a user may own multiple digital personal assistant (DPA) devices that are distributed throughout a home.

Generally, a DPA device is an electronic device with a user interface that simulates human traits that allows a human user to interact with the electronic device in a manner similar to interacting with another person, rather than a machine. For example, the DPA device may include a voice recognition system that interprets the voice input of the user and executes services or perform tasks in response thereto. The DPA device also includes a voice interface to audibly respond to the user in a natural language form.

Typically, a DPA device operates on a single device with dedicated components to interact with the user. For example, the DPA device may have a built-in microphone to receive user requests and a built-in speaker to provide communications and to output audio or video content to the user. In addition, the DPA device can include a component interface that can connect to wired or wireless electronic devices, such as smart phones, smart televisions, tablets, smart watches, smart appliances, and speakers to control operation of the electronic devices.

However, these DPA devices can be spuriously triggered by environmental speech that does not come from a user, or a human. Environmental speech can include music, radio, televisions, individuals on a conference call, or the like. As a result, the DPA device can randomly trigger resulting in annoyance, embarrassment, etc. Meanwhile, voice recognition software utilized to recognize the tone or voice of certain individuals to prevent such spurious triggering can be faulty, expensive, and difficult to manage.

Accordingly, a need remains for methods and devices that enable for preventing the spurious triggering of responses by a DPA device to environmental speech.

SUMMARY

In accordance with embodiments herein, a system for preventing a voice activated response by a digital personal is provided. The system includes a digital personal assistant that has a memory storing program instructions. The system also includes one or more processors that, when executing the program instructions, are configured to identify an audible instruction based on a determined sound, and receive a block signal accompanying the determined sound. The one or more processors are also configured to prevent a response to the determined sound based on the block signal.

Optionally, the determined sound is a word, or a phrase related to the digital personal assistant. In one aspect, to identify the audible instruction includes determining an audio source of the determined sound, and determining content of terms from the audio source following the determined sound. In another aspect, the block signal is an ultrasonic block tone between 0-20 Hz or 20-50 KHz.

Optionally, the system also includes an audio source configured to generate the determined sound and the block signal. In one aspect, the audio source is at least one of a radio streaming source, a television streaming source, a video streaming source, or a conference calling source. In another aspect, the digital personal assistant is at least one of a mobile phone or a home monitoring device. In one example, the one or more processors are also configured to respond to the audible instructions when not receiving the block signal with the determine sound. In another example, to respond to the audible instructions includes making a statement, asking a question, providing an answer, setting a timer, or playing a song.

In accordance with embodiments herein, computer implemented method for preventing a voice activated response by a digital personal assistant is provided. The method is provided under control of one or more processors including program instructions to identify an audible instruction based on a determined sound from an audio source, and to receive a block signal accompanying the determined sound from the audio source. The method also includes to prevent a response to the determined sound based on the block signal, and allow the response to the determined sound when not receiving the block signal with the determined sound.

Optionally, the determined sound is a word, or a phrase related to the digital personal assistant. In one aspect, to identify the audible instruction includes determining the audio source of the determined sound, and determining content of terms from the audio source following the determined sound. In another aspect, the block signal is an ultrasonic block tone that has is between 0-20 Hz or 20-50 KHz. In one example, the audio source is at least one of a radio streaming source, a television streaming source, a video streaming source, or a conference calling source. In another example, to respond to the audible instructions includes making a statement, asking a question, providing an answer, setting a timer, or playing a song.

In accordance with embodiments herein, a computer program product for preventing voice activated responses by a digital personal assistant is provided. The computer program product includes a non-signal computer readable storage medium comprising computer executable code to identify an audible instruction based on a determined sound, receive an ultrasonic block tone accompanying the determined sound, and prevent a response to the determined sound based on the ultrasonic block tone.

Optionally, the determined sound is a word, or a phrase related to the digital personal assistant. In one aspect, to identify the audible instruction includes determining an audio source of the determined sound, and determining content of terms from the audio source following the determined sound. In another aspect, the ultrasonic block tone is between 0-20 Hz or 20-50 KHz. In one example, the digital personal assistant is at least one of an electronic device, a mobile phone, or a home monitoring device.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Terms

The term "audible instruction" as used herein refers to any sound that would result in a DPA device performing a function if not for a DPA sound filter application from preventing the function. The sound may be any and all sounds that occur after a determined sound occurs. The "instruction" does not refer to the intent of the audio source (e.g. person, electronic device, etc.) making the sound, but instead the functioning of the DPA device in responding to the sound. The sound may be a command, question, word, beep, phrase, or the like that would result in the function by the DPA device if not for a DPA sound filter application. For example, the determined sound may be the term "Echo" while the audible instruction is the question from a person "who was the first president of the United States?" This question results in the function of the DPA device stating, "George Washington was the first President of the United States." In another example, a television program could have dialog that states "hey Google a restaurant for us to eat at." In this example, the phrase "hey Google" is a determined sound, and the phrase "a restaurant for us to eat at" is the audible instruction. In particular, after receiving the determined phrase "hey Google", the DPA device will attempt to determine an action to associate with the phrase "a restaurant of us to eat at". So, when not utilizing a DPA sound filter application, the DPA device may either provide a name of restaurants, or make a statement such at "I don't understand." In other examples, the functioning of the DPA device may also include making a call, turning up the volume of an electronic device, playing a song, or the like. Still, the audible instruction is the sounds that received by the DPA device that come directly after a determined phrase is received.

The term "block signal" as used herein refers to any and all waves, sounds, tones, signals, or the like that are communicated to a DPA device so the DPA device can prevent an audible instruction from being performed. In one example, the block signal may be an ultrasonic block tone that may not be heard by a human. In an example, the ultrasonic block tone is between 0-20 Hertz (Hz) or 20-50 kilo Hertz (KHz).

The term "determined sound" as used herein refers to word, phrase, combination of words, sounds, or the like that trigger, or result in a DPA device performing a function based on the audible instructions following the determined sound. Example determined sounds may include "Echo", "Alexa", "Google", "hey Google", "Siri", or the like. The function may include increasing volume, answering a question, providing a translation, making a phone call, actuating an electronic device, scheduling an appointment, playing a song, or the like. The determined sound may be provided by any audio source, including a person, electronic device, television, radio, computing device, laptop computing device, tablet, mobile phone, or the like.

The term "digital personal assistant", "DPA", "DPA device", "virtual assistant", "intelligent digital assistant", as used throughout, shall generally refer to functionality of any electronic device that has a user interface or information processing system that uses a voice recognition system, such as a Natural language understanding (NLU), automatic speech recognition (ASR), or text-to-speech synthesis (TTS), to interpret natural language input in spoken form and/or textual form to infer intent, and perform actions based on an inferred user intent. DPA devices may be, or have a component interface that can connect to and control, wired or wireless electronic devices, such as smart phones, smart televisions, tablets, smart watches, smart appliances, and smart speakers to control operation of the electronic devices. For example, a digital personal assistant may receive a user instruction in the form of a natural language command, request, statement, narrative, and/or inquiry. A user instruction may seek either an informational answer or performance of an action by the digital personal assistant. Accordingly, the digital personal assistant can perform the requested action, send a control signal via the component interface to a connected electronic device to perform the requested action, and/or provide responses in audio and/or visual form, such as natural language, music, video, text, animations, etc.

The term "environment" refers to a physical region i) surrounding one or more DPA devices that communicate with one another and ii) in which implementations of DPA functions are at least partially perceivable by individuals. By way of example, an environment may refer to one or more rooms within a house, office or other structure. An environment may or may not have physical boundaries. For example, an environment may refer to one or more of a pool area, a deck, a backyard, exterior areas outside of an office, a commercial area, either alone or in addition to one or more rooms in a house, office, or other structure, where approximate virtual boundaries of the environment correspond to the range over which operational states at and/or actions performed by and/or controlled by at least one DPA device of the group of DPA devices may be heard, seen, felt or otherwise perceived by individuals when present in at least a portion of the environment.

The term "obtain" or "obtaining", as used in connection with data, signals, information and the like, includes at least one of i) accessing memory of a network hub or resource manager where the data, signals, information, etc. are stored, ii) receiving the data, signals, information, etc. over a wireless communications link between the DPA device and the network hub, and/or iii) receiving the data, signals, information, etc. at a resource manager over a network connection. The obtaining operation, when from the perspective of a DPA device, may include sensing new signals in real time, and/or accessing memory to read stored data, signals, information, etc. from memory within the electronic device. The obtaining operation, when from the perspective of a network hub, includes receiving the data, signals, information, etc. at a transceiver of the network hub where the data, signals, information, etc. are transmitted from a DPA device and/or a resource manager. The obtaining operation may be from the perspective of a resource manager, such as when receiving the data, signals, information, etc. at a network interface from a network hub and/or directly from a DPA device. The resource manager may also obtain the data, signals, information, etc. from local memory and/or from other memory, such as within a cloud storage environment and/or from the memory of a workstation.

Figure 1:
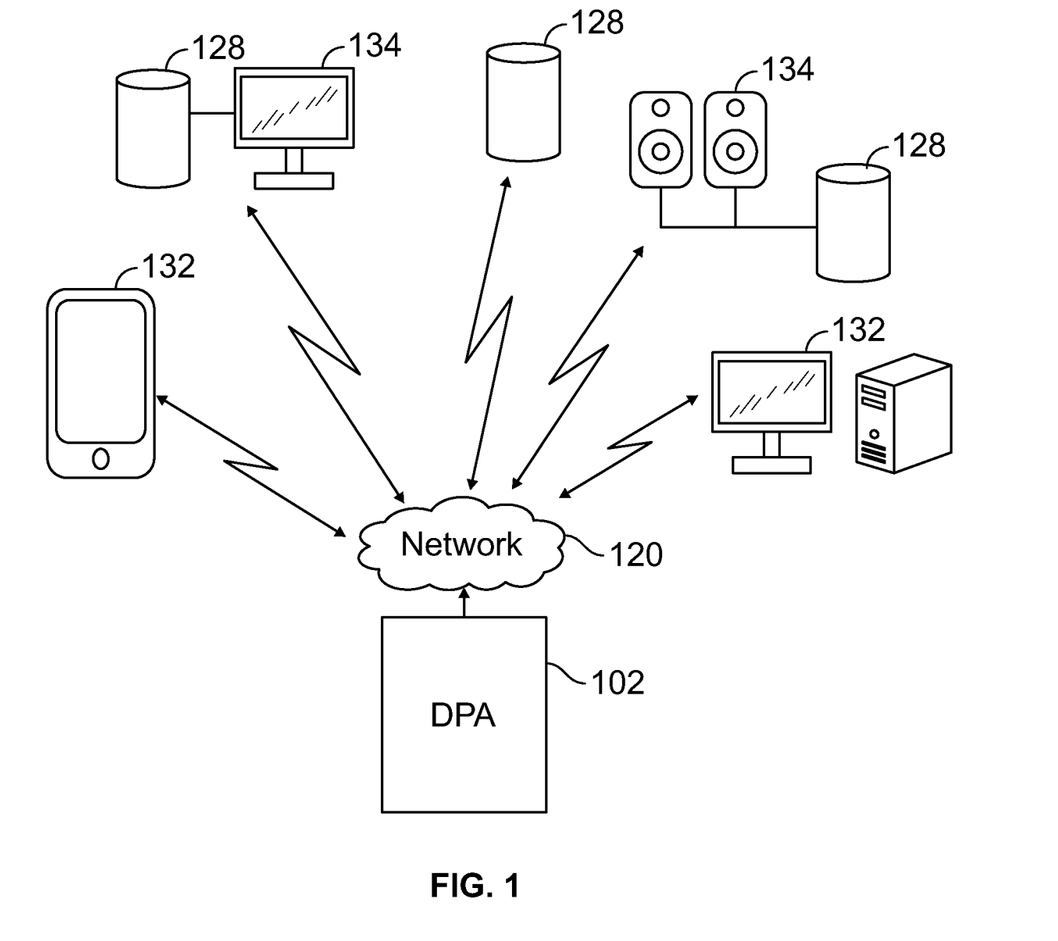
FIG. 1 illustrates a system for preventing a voice activated response by a digital personal assistant device in accordance with embodiments herein.

FIG. 1 illustrates a system 100 for preventing an audio or voice activated response by a DPA device in accordance with embodiments herein. The system 100 can include a DPA device 102. For example, a DPA device 102 may be a smartphone, smartwatch, home monitoring device, speakers, home theater systems, computers, tablet devices, mobile phones, televisions, communication content players, and the like. In example embodiments, the DPA device 102 may represent an Amazon Echo® device, Google Home' device, and the like.

Figure 2:
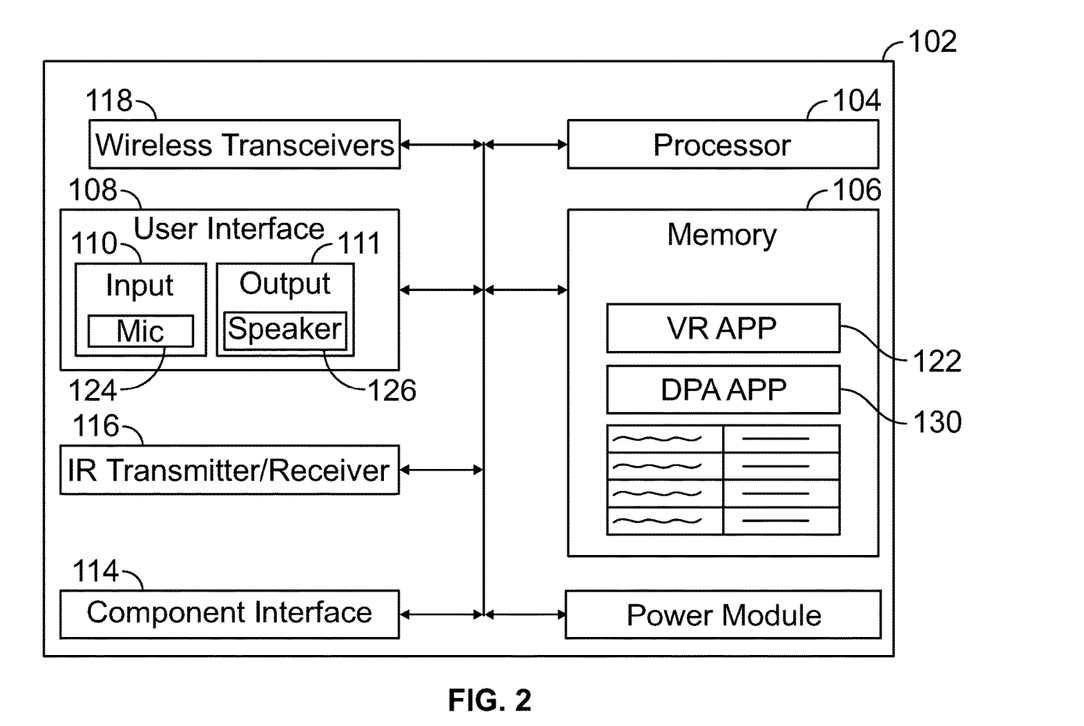
FIG. 2 illustrates a schematic block diagram of a control system for a digital personal assistant.

As shown in FIG. 2, a DPA device 102 can include components such as one or more processors 104 (e.g., a microprocessor, microcomputer, application-specific integrated circuit, etc.), one or more local storage medium (also referred to as a memory) 106, a user interface 108 which includes one or more input circuits 110 and one or more output circuits 111, a power module 112, a component interface 114, an infrared (IR) transmitter/receiver 116 and one or more wireless transceivers 118. All of these components can be operatively coupled to one another, and can be in communication with one another, by way of one or more internal communication links, such as an internal bus. The DPA device 102 may communicate with other electronic devices, including other DPA devices over a network 120, through the wireless transceiver 118, and/or over a separate wired or wireless link there between. For example, an auxiliary output may be used to form a wired connection. Optionally, a Bluetooth link or other wireless link may be utilized for a direct wireless connection.

The memory 106 may encompass one or more memory devices of a variety of forms (e.g., read only memory, random access memory, static random access memory, dynamic random access memory, etc.) and can be used by the processor 104 to store and retrieve data. The data that is stored by the memory 106 can include, but need not be limited to, operating systems, applications, user collected content, and informational data. Each operating system includes executable code that controls basic functions of the device, such as interaction among the various components, communication with external devices via the wireless transceivers 118, the component interface 114, and/or the IR transmitter/receiver 116, and storage and retrieval of applications and data to and from the memory 106. The memory also includes applications that include executable code that utilizes an operating system to provide more specific functionality for the communication devices, such as file system service and handling of protected and unprotected data stored in the memory 106.

Optionally, the input and output circuits 110, 111 may each include a variety of visual, audio, and/or mechanical devices. For example, the input circuit 110 can include a visual input device, such as an optical sensor or camera, and/or a mechanical input circuit such as a keyboard, keypad, selection hard and/or soft buttons, switch, touchpad, touch screen, icons on a touch screen, a touch sensitive areas on a touch sensitive screen and/or any combination thereof. Similarly, the output circuit 111 can include a visual output circuit such as a liquid crystal display screen, touch sensitive screen, a non-touch sensitive screen, a text-only display, a smart phone display, an audio output (e.g., a speaker or headphone jack), and/or any combination thereof and/or one or more light emitting diode indicators. The output circuit 111 is integral to (e.g., within a common housing) the DPA device 102.

The input circuit 110 receives user instructions in various manners, such as using a voice recognition (VR) application 122. The processors 104 execute instructions stored in the memory 106 to interpret and perform actions based on user instructions that are received through the input circuit 110. The user instruction may represent requests of various types. By way of example, some types of user instructions seek information, such as a question that may be answered by a DPA device 102 based on content stored therein and/or an automated searched over the Internet and the like. Other types of user instructions may instruct one or more electronic devices 102 to perform various types of actions and/or execute various types of commands, as described herein.

The input circuit 110 obtains all sound waves in the local environment to be communicated to the VR application 122. The sound waves can include determined sounds, audible instructions, block signals, ultrasonic block tones, auxiliary noises, or the like. The determined sounds include all sounds that cause a DPA device 102 to activate, or perform a function. To this end, a determined sound may be a word, or phrase that causes the activation or performance of a function by the DPA 102. In one example, the determined sound may be the phrase "Hey Google", or the word "Alexa", or "Echo". Alternatively, the determined sound may be a word or phrase chosen by a user and programed into the DPA device 102. The audible instruction is any sound immediately following the determined sound. The audible instruction may be a question, command, request to set a timer, a sound that cannot be understood by the DPA device 102 or the like. In particular, the audible instruction is sound upon which the VR application 122 utilizes to have the DPA 102 perform a function such as answering a questions, playing a song, turning up volume, setting a timer, adding a meeting to a schedule, or the like. The input circuit 110 can include one or more audio input circuits, such as a microphone 124 that is configured to receive the audio input (e.g., instructions, requests) from the user. The output circuit 111 can include one or more electronic devices, such as a speaker 126, that are configured to communicate notification alerts or notification content to the user.

In association with the VR application 122, the user interface 108 allows the user to communicate with a DPA device 102 by communicating and receiving audio input in the form of natural language. The VR application 122 may interpret the audio input received by the input circuit 110 and may generate communication content, such as a voice interface to audibly respond to the user in a natural language form. The user interface 108 permits the user to operate the DPA device 102 for any of its intended purposes, such as administering the VR application 122, operating software applications, electronic communication, listening to audio media, and the like.

With reference back to FIG. 1, the DPA device 102 is also configured to access network resources 128, including web-based or network-based data, applications, and services, via the network 120. The network 120 may represent one or more of a local area network (LAN), a wide area network (WAN), an Intranet or other private network that may not be accessible by the general public, or a global network, such as the Internet or other publicly accessible network. The network 120 provides communication between the DPA device 102 and one or more network resources 128. It will be understood that, in some embodiments, the network resources 128 may represent a single entity or one or more physical or virtual servers that are configured to deliver online resources to a DPA device 102. Examples of the network resources 128 include, but are not limited to, web-based or network-based data storage services, social networking applications, shopping services, payment services, multimedia content delivery services, financial services, web conference services, and the like. The resources 128 may represent a Web service or a network service for an e-commerce business, financial institution, or any other commercial, noncommercial, personal, nonprofit or other entity.

In addition to the VR application 122, a DPA sound filter application 130 (FIG. 2) can also be stored in the memory 106 to provide instructions to the one or more processors 104 to control the output of the VR application 122. The DPA sound filter application 130 interacts with the VR application 122 to provide voice recognition, and to filter sounds coming from other electronic devices 132. The DPA sound filter application 130 obtains all sound waves in the local environment. The sound waves can include determined sounds, audible instructions, block signals, ultrasonic block tones, auxiliary noises, or the like.

The block signal in one example is an ultrasonic block tone that is an ultrasonic sound that cannot be audibly heard by a human, but can be received and identified by the DPA device 102 and communicated to the DPA sound filter application 130. In one example, the ultrasonic block tune is between 0-20 Hertz (Hz) or 20-50 kilo Hertz (KHz). A human typically can only hear sounds generated at 20 Hz to 20 KHz, and as a result, the ultrasonic block tune is provided either above or below that range so that the ultrasonic block tune cannot be heard by a human. The ultrasonic block tone is a sound wave that may be continuously produced by an audio source 134 while the audio source 134 is producing an audible sound wave. The audio source 134 may include humans, electronic devices, other devices that make noise, or the like. In one example the audio source 134 can include a radio streaming source, a television streaming source, a video streaming source, a conference calling source, etc.

In one example, the block signal may be produced as a result of an electronic device 132, that is the audio source 134, having a sound application 136 that monitors for applications, programs, etc. that produce audible sound, and in response to generating the audible sound, the block signal is automatically also generated by the electronic device 132. As an example, a user may use a smartphone to play music. When the sound application 136 recognizes that the music is being generated, the block signal is automatically generated. In another example, the sound application 136 may detect when a movie is being streamed onto a laptop computer and generate the block signal during the duration of the streaming of the movie. In yet another example, the sound application 136 may identify that a smart speaker is being utilized for a conference call, resulting in the block signal being generated during the conference call.

In another example, instead of the audio source 134 being an electronic device, the audio source 134 may be a secondary sound application 138. For example, a secondary sound application 138 may be part of a conference calling application, such that the secondary sound application 138 automatically communicates from the conference calling application to electronic devices to generate the block signal during the duration of a conference call. In another example, the secondary sound application 138 can be part of a streaming application such that when streaming is occurring, the block signal is automatically generated as part of the streaming. In this manner, the block signal may be generated by a secondary sound application 138 of and audio source 134 including electronic devices, an application, or the like. Regardless, the audio source 134 provides the block signal that can be identified by the DPA sound filter application 130 to prevent sounds coming from the audio source from triggering or actuating the DPA device 102.

The VR and DPA sound filter applications 122, 130 include instructions accessible by the one or more processors 104 to direct the processor 106 to implement the methods, processes and operations described herein including, but not limited to, the methods, processes and operations illustrated in the Figures and described in connection with the Figures. In an alternative embodiment, the VR and DPA sound filter applications 122, 130 may operate from one or more storage medium (also referred to as cloud storage).

Figure 3:
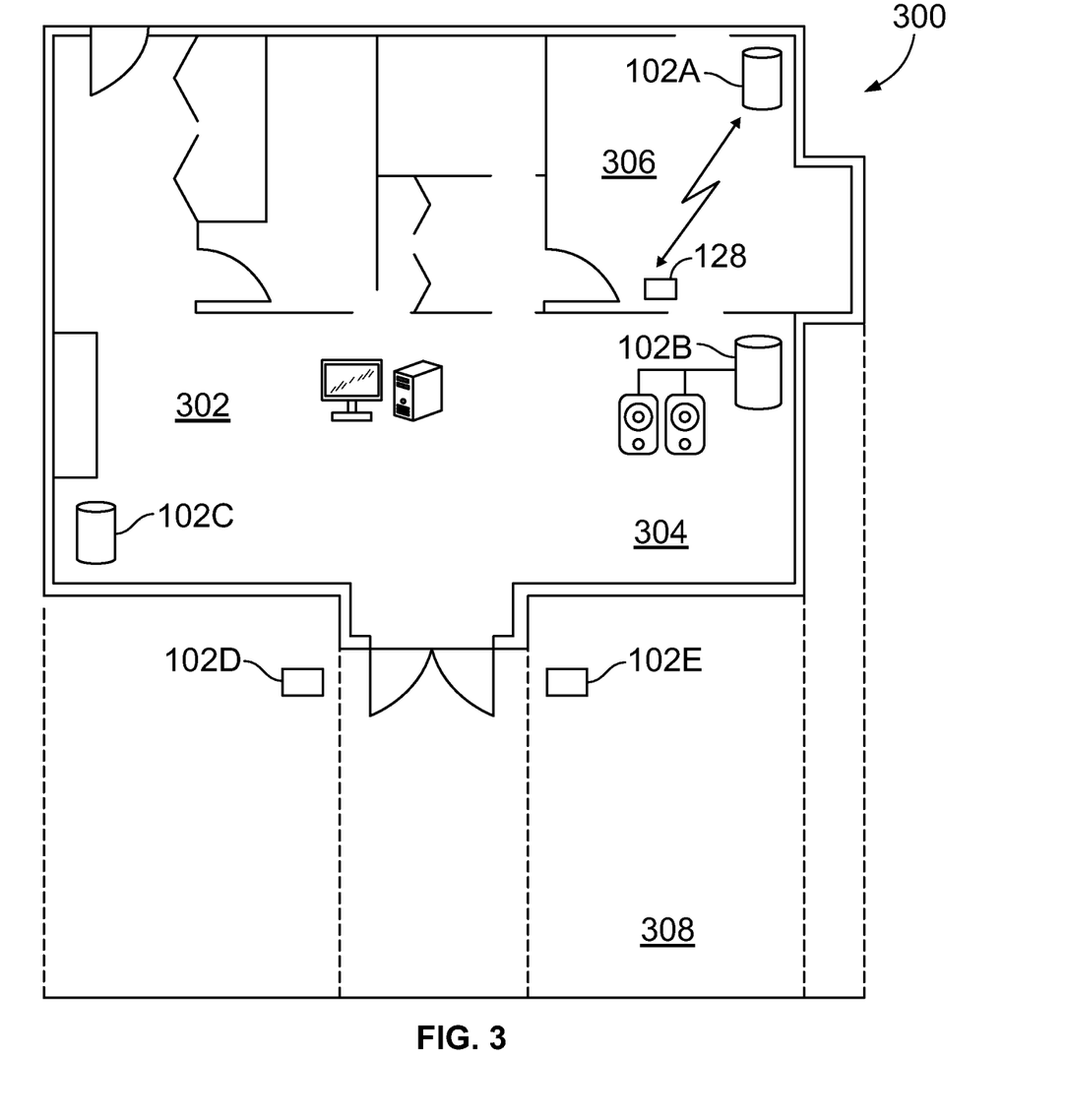
FIG. 3 illustrates a top plan view of an example environment in which embodiments herein may be implemented.

FIG. 3 illustrates a top plan view of an example environment in which embodiments herein may be implemented. The environment 300 may represent a home, office, or other structure. In the example of FIG. 3, the environment 300 represents a home with a living room region 302, a kitchen region 304, a bedroom region 306, and an outdoor region 308. The DPA devices 102A-D are shown at representative locations distributed throughout the environment 300. Additionally or alternatively, one or more of the audio sources 310 may be within the environment. In one example each audio source 310 may be an electronic device Embodiments herein enable the DPA device 102A-D to obtain of sounds waves from the audio sources 310, and obtain an accompanying block signal from each audio source 310 that prevents a response by the DPA devices 102A-D when an electronic device utilizes a determined sound. The block signal is considered accompanying a determined sound because they both are provided at the same time. The blocking signal is continuously being provided or generated by an audio source, and as a result, when the determined sound is also provided, the block signal accompanies the determined sound because they are occurring at the same time. Similarly, the determined sound is considered to accompanying the block signal. The response prevented may include making a statement, asking a question, providing an answer, setting a timer, or playing a song.

With reference to the example environment of FIG. 3, the DPA sound filter application 130, based on user instruction, configures audio settings to identify determined sounds, and detect accompanying block signals. The determined sounds can be any sounds that can result in the actuation of a DPA device 102A-D. The determined sound may be one word, a phrase, or the like such as "hey Google", "Echo", or the like that results in the activation of the DPA device to determine audible instructions coming after the determined sound. In one example, the DPA sound filter application 130 receives the determined sound. Alternatively, the VR application 122 obtains or receives the determined sound and communicates with the DPA sound filter application 130 that the determined sound has been received. In yet another example, another application, electronic device, etc. obtains the determined sound and communicates the determined sound to the DPA sound filter application 130.

In one example, the DPA sound filter application 130 configures audio setting to continuously monitor and obtain block signals. In another example, after obtaining the determined sound, the DPA sound filter application 130 configures the audio setting to determine if a block signal is present.

In another example, the DPA sound filter application 130 configures the audio setting to continuously monitor and obtain block signals, and once a block signal is obtained, the DPA sound filter application configures the DPA device 102A-D to determine the location of the audio source 310. In this manner, if an individual is using an audio source 310 and desires the DPA device 102A-D to perform a function based on an audible instruction, the DPA sound filter application can determine that the audible instruction from a human is a different audio source than an electronic device that is providing the block signal. In particular, when a determined sound is identified, or obtained by the DPA sound filter application 130, not only is a determination made regarding whether a block signal exists in the environment 300, but additionally whether the block signal is generated by the same audio source 310 as the determined sound. To this end, the DPA sound filter application 130 may communicate with the VR application 122 that may recognize and determined certain sounds, or voices, in the environment as a human voice. Consequently, the DPA devices 102A-D may still operate for their intended purpose, even when the block signal exists in the environment 300.

As an example, an individual may watch a movie on a smart television called "Lincoln Vampire Hunter" involving historical figures, and desire to know if the movie is based on actual events. Either the smart television, or a streaming service providing the movie may include a sound application that generates the block signal. The DPA sound filter application 130 may be configured to detect, identify, or obtain the block signal, and determine the audio source 310 (e.g. the smart television) is generating the block signal. During the movie, when the individual watching wants to know if the movie is based on actual events, the individual may ask "Echo, is the movie Lincoln Vampire Hunter based on actual events?" Upon identifying the determined sound "Echo" the DPA sound filter application 130 then determines that the audio source (e.g. the individual) is at a different location than the audio source 310 (e.g. the smart television) that is generating the block signal, and thus does not prevent the DPA device from responding to the question. Alternatively, the DPA sound filter application 130 may communicate with the VR application 122 that recognizes the individuals voice as different than the sounds from the smart television to determine that the DPA device 102A-D should respond to the inquiry.

Later during the movie, the movie may include the line "did you hear that echo from over there?" Again, the DPA sound filter application 130 identifies the determined sound "echo" has been utilized. Only this time, a determination is made that the audio source 310 that is generating the block signal is also the audio source 310 that provided the determined sound. As a result, the DPA sound filter application 130 prevents the DPA device 102A-D from providing a response to the use of the determined sound by the television based on receiving the block signal from the audio source.

Figure 4:
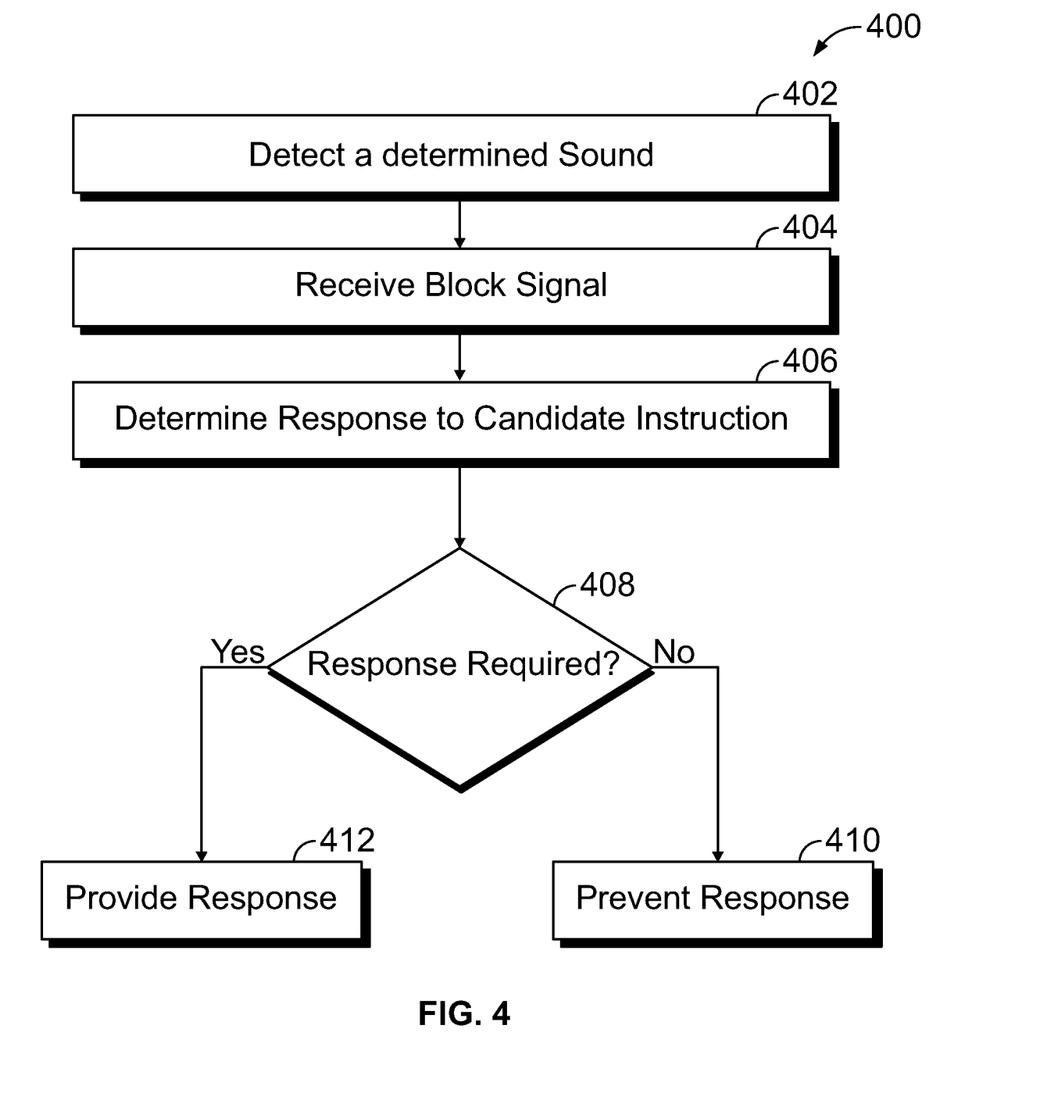
FIG. 4 illustrates a process for preventing a voice activated response by a digital personal assistant in accordance with embodiments herein.

FIG. 3 illustrates a process 300 for preventing a audio or voice activated response by a DPA as a result of an electronic device providing a determined sound. In one example, the DPA is the DPA of FIG. 1, or one of the DPAs as illustrated in the environment of FIG. 3. The electronic device may be any of the audio sources as provided in FIGS. 1 and 3.

At 402, one or more processors of a DPA device detect a determined sound. The determined sound may be a term or terms utilized to activate a DPA device. In example embodiments the term or terms may include "Alexa", "Hey Google", "Siri" or the like. The DPA device can include sensors that include voice recognition applications used to detect and identify the determined sound.

At 404, the one or more processors of the DPA determine whether a blocking signal is received. In response to the determine sound, the one or more processors monitor for a blocking signal from the same source as the determined sound. The blocking signal may be generated by an application, resource, or the like. The blocking signal is not audible by individuals in the environment; however, can be detected by at least one sensor of the DPA. In one example, the block signal is an ultrasonic block tone that is provided in the range that is outside the range a human can hear, wherein a human can hear in a range between 20 Hz-20 KHz. In another example, the block tone is between 0-20 Hz or 20-50 KHz. In another example the block tone is above 50 KHz. The block signal may be automatically generated by the electronic device that is the audio source, or by an application utilizing the electronic device that is the audio source. Still, the block signal is generated by the same audio source as the determined sound.

At 406, the one or more processors determine a response to a candidate instruction is provided. Any and all sounds occurring after the determined sound are candidate instructions because such sound may include a question, command, request, or the like associated with an activity a user desires the DPA to perform. Based on any and all sound occurring after the determined sound, the DPA may utilize a VR application, filtering application, or the like to determine a response to the candidate instruction. In one example, the response is the answer to a question. In another example the response is to set a timer. In yet another example the response is to state, "I don't understand", "unable to process your request", or some other similar phrase.

At 408, the one or more processors of a DPA determines whether the candidate instruction is an instruction to which a response is required. In one example, the DPA device includes a DPA sound filter application that configures the DPA device to detect a block signal. In one example, the DPA sound filter application communicates with a VR application. Alternatively, the DPA device does not include a VR application, and/or the DPA sound filter application does not communicate with a VR application. Still, the DPA sound filter application configures the DPA device to identify the audible instruction based on the determined sound. As discussed, the determined sound may be a word, phrase, or the like utilized to trigger a response from the DPA device. In one example, to identify the audible instruction includes determining an audio source of the determined sound, and determining content of terms from the audio source following the determined sound. The audio source can be a person, electronic device, or the like. The terms as used herein include words, phrases, noises, sounds, or the like. To this end, to determine the content of the terms includes determining a question is present, determining a known word or phrase cannot be determined, determining a word or phrase, determining a command, or the like.

If at 408 the one or more processors have received a block signal at 404, then at 410, the one or more processors prevent the determined response. As used here, prevent is any action that results in an auditory response from being provided by the PDA. The auditory response may be prevented by stopping a signal, reducing sound on the PDA, temporarily disabling a speaker, or the like. In one example, the one or more processors simply prevent any auditory response from occurring at the DPA when the block signal is received. In another example, if a block signal is received, the one or more processors attempt to determine if the determined sound was generated by the same source as the block signal. The DPA sound filter application may configure the DPA device to locate the location of the electronic device (e.g. audio source) proving the block signal. Alternatively, the DPA sound filter application may configure the DPA to communicate with the VR application to determine if a predetermined sound is from a voice recognized by the VR application. In each instance, a determination is made whether the predetermined sound comes from the audio source that generates the block signal. If the sources are the same, the response is prevented, or stopped.

If the sources are determined to be different, or if no block signal is detected, then at 412, the one or more processors provide the response. In this manner, the DPA sound filter application allows a response to the determined sound when not receiving the block signal with the determined sound. The response may include making a statement, increasing volume of the DPA, asking a question, providing an answer, setting a timer, or playing a song.

By providing the DPA sound filter application that configures the DPA to simply monitor for an ultrasonic blocking tone, a simple solution for preventing an undesired voice activated response to electronic devices is provided. Consequently, expensive voice recognition software is simply unneeded to prevent the unwanted voice activated response. Addition, when such sophisticated voice recognition software exists, the DPA sound filter application can communicate with the voice recognition software to provide even better functioning. Also, the ultrasonic blocking tone is a signal that is unable to be heard by anyone in an environment, yet can still be detected by a DPA device. Consequently, annoyance within the environment is minimized.

CLOSING STATEMENTS

Before concluding, it is to be understood that although e.g., a software application for undertaking embodiments herein may be vended with a device such as the system 100, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. Further, in the following claims, phrases in the form of "at least A or B", "A and/or B", and "one or more of A and B" (where "A" and "B" represent claim elements), are used to encompass i) A, ii) B and/or iii) both A and B.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A system for preventing a voice activated response by a digital personal assistant comprising:
    a digital personal assistant comprising:
        a memory storing program instructions;
        one or more processors that, when executing the program instructions, are configured to:
            identify an audible instruction based on a determined sound;
            receive a block signal accompanying the determined sound; and
            prevent a response to the determined sound based on the block signal; and
    an electronic device;
    wherein under control of one or more processors of the electronic device including program instructions to:
    monitor for applications or programs that produce audible sound waves;
    determine the electronic device is producing the audio sound waves of the applications or programs; and
    automatically generate the block signal for a duration of time the applications or programs are producing the audible sound waves in response to determining the electronic device is producing the audio sound waves.

2. The digital personal assistant of claim 1, wherein the determined sound is a word, or a phrase related to the digital personal assistant.

3. The digital personal assistant of claim 1, wherein to identify the audible instruction includes determining the audio source of the determined sound, and determining content of terms from the audio source following the determined sound.

4. The digital personal assistant of claim 1, wherein the block signal is a block tone between 0-20 Hz or 20-50 KHz.

5. The system of claim 1, wherein the digital personal assistant is at least one of a mobile phone or a home monitoring device.

6. The system of claim 1, wherein the one or more processors are further configured to:
    respond to the audible instructions when not receiving the block signal with the determined sound.

7. The system of claim 1, wherein to respond to the audible instructions includes making a statement, asking a question, providing an answer, setting a timer, or playing a song.

8. The system of claim 1, wherein the audible sound waves include additional sound waves that do not include the determined sound and the electronic device is further configured to produce the block signal while the additional sound waves are generated.

9. The system of claim 8, wherein the electronic device is configured to generate the block signal in response to generating the audible sound waves.

10. A computer implemented method for preventing a voice activated response by a digital personal assistant comprising:
- under control of one or more processors of a digital personal assistant including program instructions to:
  - identify an audible instruction based on a determined sound from an electronic device;
  - receive a block signal accompanying the determined sound from the electronic device;
  - prevent a response to the determined sound based on the block signal; and
  - allow the response to the determined sound when not receiving the block signal with the determined sound;
- under control of one or more processors of the electronic device including program instructions to:
- monitor for applications or programs that produce audible sound waves;
- determine the electronic device is producing the audio sound waves of the applications or programs; and
- automatically generate the block signal for a duration of time the applications or programs are producing the audible sound waves in response to determining the electronic device is producing the audio sound waves.

11. The method of claim 10, wherein the determined sound is a word, or a phrase related to the digital personal assistant.

12. The method of claim 10, wherein to identify the audible instruction includes determining the electronic device of the determined sound, and determining content of terms from the electronic device following the determined sound.

13. The method of claim 10, wherein the block signal is a block tone that has is between 0-20 Hz or 20-50 KHz.

14. The method of claim 10, wherein to respond to the audible instructions includes making a statement, asking a question, providing an answer, setting a timer, or playing a song.

15. A computer program product for preventing voice activated responses by a digital personal assistant comprising a non-signal computer readable storage medium comprising computer executable code to:
- identify, at a digital personal assistant, an audible instruction based on a determined sound;
- receive, at the digital personal assistant, a block tone accompanying the determined sound; and
- prevent, at the digital personal assistant, a response to the determined sound based on the block tone;
- monitor, at an electronic device, for applications or programs of the electronic device that produce audible sound waves;
- determine, at the electronic device, the electronic device is producing the audio sound waves of the applications or programs; and
- automatically generate, at the electronic device, the block signal for a duration of time the applications or programs are producing the audible sound waves in response to determining the electronic device is producing the audio sound waves.

16. The computer program of claim 15, wherein the determined sound is a word, or a phrase related to the digital personal assistant.

17. The computer program of claim 15, wherein to identify the audible instruction includes determining an audio source of the determined sound, and determining content of terms from the audio source following the determined sound.

18. The computer program of claim 15, wherein the block tone is between 0-20 Hz or 20-50 KHz.

19. The computer program of claim 15, wherein the digital personal assistant is at least one of an electronic device, a mobile phone, or a home monitoring device.

* * * * *